3,148,194
CERTAIN 1,4-BIS[2(4-SUBSTITUTED, 5-PHENYL-OXAZOLYL)] BENZENES
Thomas D. Waugh and Derek Walker, Boulder, Colo., assignors to Arapahoe Chemicals, Inc., Boulder, Colo., a corporation of Colorado
No Drawing. Filed July 3, 1961, Ser. No. 121,389
4 Claims. (Cl. 260—307)

This invention is concerned with oxazole compounds and more particularly with compounds having the formula

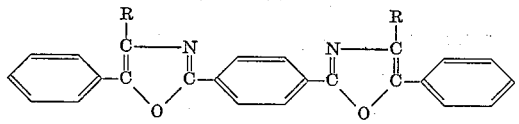

In this and succeeding formulas, R represents lower alkyl containing from 1 to 4 carbon atoms, inclusive, phenyl, tolyl, xylyl or ethylphenyl. The invention also relates to methods and compositions for scintillation counting.

The products of the present invention are yellow solids, substantially insoluble in water and soluble in many organic solvents such as toluene, benzene, xylene, diisopropyl ether, acetone, dimethylformamide, anisole, phenylcyclohexane, 1,3-dimethoxybenzene, 1,4-dioxane, kerosene and other petroleum hydrocarbons. The oxazole compounds of the present invention are useful as optical brightening agents, pharmaceutical intermediates and as scintillators or scintillation solutes.

Scintillation counting, an assay technique for measuring radioactivity, finds wide application such as in the study of biochemical and pharmacological action of drugs and agricultural chemicals in human beings and animals, in the study of the path of added nutrients and growth regulators in plants, in the study of lubricating oil consumption in gasoline combustion engines, in monitoring a secondary loop in a heavy water moderated reactor, in monitoring systems involving circulating liquids and gases, in the study of organic reaction mechanisms, etc. Scintillation counting depends on the measurement of light emitted by a scintillator when said scintillator is excited by energy which has its origin in a radioactive source. A scintillator, frequently called a scintillation solute, phosphor or fluor, has the property of emitting fluorescent light. The most versatile scintillation counting technique is liquid scintillation counting. In this technique, the system comprises an organic solvent, a primary solute or scintillator, and a secondary solute or scintillator; both primary and secondary solutes are organic compounds. The secondary solute, frequently called wavelength shifter has the property of converting the light emitted by the primary solute to longer wavelengths. The system may be varied, for example, by the addition of (1) supplementary solvents, (2) solutes to improve the response for certain uncharged particles such as neutron capture solute or gamma conversion solute, or (3) gels to provide a gel counting system. Another scintillation counting technique is plastic scintillation counting. In this technique, the liquid solution of the liquid counting system is replaced by a solid solution of the scintillator in a plastic organic polymer. In view of the greater versatility of the liquid system over the solid system, particularly with respect to size of the system with which the counting technique might be applied, liquid scintillation counting is more widely used and problems which arise are frequently associated therewith.

The value of a scintillator depends, among other things, on how well the wavelength distribution of light emitted by the scintillator matches the wavelength response of the detector. Many highly fluorescent organic compounds have been considered poor to useless as scintillators because their fluorescence spectra provide a poor match with the photomultiplier tube response of the most generally available detector systems while other organic compounds capable of emitting light at wavelengths compatible with the available detector systems are of such low solubility in suitable transparent solvents that a sufficiency of such compounds cannot be dissolved therein to provide usefully detectable light emission. Moreover, many compounds have adverse solubility properties when the counting system is modified such as by decreasing the temperature or by adding water or other materials. Furthermore, certain fluorescent materials have other drawbacks such as self-quenching, poor energy transfer from a particular solvent system, or are economically impractical. The current practice of employing both primary and secondary solutes is necessitated by the current scintillation detector systems which are unable to respond adequately to the light emitted by the primary scintillators. However, the use of existing secondary solutes has not provided the ultimate answer to liquid scintillation counting techniques. Known scintillators of desirable optical characteristics have such exceedingly low solubility that in the choice of scintillators as secondary solutes, a compromise has been made between the desirable fluorescence properties necessary for good response and sufficient solubility for detectable response. With the wider application of scintillation counting as a research tool and as a method for routine analysis, and especially with the development of large liquid scintillation counters, there has arisen a need for better secondary solutes. Of major importance is the requirement for a more soluble secondary solute. A particular requirement is a secondary solute which has sufficient solubility in solvents of high flash points. The latter requirement, unforeseen in the early development of scintillation counting, has become of major importance with the wide use of scintillation counting techniques and the enhanced fire hazards accompanying increased use of organic counting solutions. The presently available secondary solutes have been found to be of such low solubility in solvents with flash points high enough to be considered safe for general use as to render said solutes impractical. Thus, it is evident that there is a need for a scintillator suitable as a secondary solute that has higher solubility than those now in use. There is, further, a need for a scintillator which has suitable solubility properties in transparent solvents having high flash points. Of additional importance in view of the presently existing detector systems is the need for solutes having light emission maxima at longer wavelengths than the currently employed solutes without sacrifice or other properties such as solubility or efficiency of energy conversion. Moreover, these problems must be met without the development of such complex compounds as to render use of same economically infeasible.

It has been discovered according to the present invention that the new oxazole compounds above defined have outstanding properties. Moreover, the novel compounds have desirable unexpected combinations of properties. The oxazole compounds of the present invention have high solubility in suitable scintillation solvents. Further, the compounds have useful solubility not possessed by currently available secondary scintillators in the transparent high flash point hydrocarbon solvents preferred for large scale application. Moreover, good solubility characteristics are retained with temperature variation. In addition, the novel compounds of the present invention have been found to have fluorescence maxima at significantly increased wavelengths. Other useful properties of the novel compounds may be seen from the following specification and claims.

The oxazole compounds of the present invention may be prepared by the reaction of terephthaloyl chloride with an aminoketone, preferably as its hydrochloride and having the formula

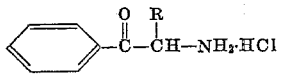

to produce an intermediate azaketone having the formula

followed by the reaction of the latter with an acid cyclizing agent to produce the desired oxazole compound.

In carrying out the first step of the reaction, about one molar proportion of terephthaloyl chloride, dissolved in an inert organic solvent, is mixed together with stirring and cooling with about two or more molar proportions of an appropriate aminoketone hydrochloride, dissolved in water. Suitable solvents for terephthaloyl chloride include toluene, benzene and xylene. The mixing step is preferably carried out by adding a solution of terephthaloyl chloride to the solution of aminoketone while the temperature of the reaction mixture is maintained below about 10° C. After completion of the addition and the components are thoroughly mixed, a sufficiency of a basic reagent is added to react with the hydrogen chloride. Suitable basic reagents include potassium bicarbonate, sodium bicarbonate, sodium acetate and potassium acetate. The basic reagent is preferably added as a solid and with cooling of the reaction mixture. After completion of the addition, the dissolution and reaction of the basic reagent, the reaction mixture is stirred over a period of from about one to sixteen hours or longer while the temperature is allowed to rise gradually to room temperature or about 30° C. During this period a reaction takes place with the formation of an azaketone intermediate which precipitates in the reaction mixture. The latter is recovered by filtration and may be purified, if desired, by conventional procedures.

In carrying out the second step of the reaction, the azaketone intermediate prepared as above described is cyclized by mixing together with an acidic reagent to produce the desired oxazole product. Suitable acidic reagents include sulfuric acid, phosphorus pentoxide and phosphorus oxychloride. The exact amounts of the acidic agent is not critical but usually a large excess is employed, the acid agent, if liquid, functioning also as a solvent. With phosphorus pentoxide, an inert solvent such as benzene or toluene may be employed as reaction medium. The reaction is carried out over a period of from about one-half to twelve hours with or without application of external heat depending on the acidic reagent used in cylization. Thus, when sulfuric acid is used as a cyclizing agent, the reactants are mixed together and stirred at ambient temperature for one-half to two hours; when phosphorus oxychloride is used as cyclizing agent, the mixture is heated at reflux temperature of the reaction medium for from eight to twelve hours; other modifications and variations in reagents to be employed are well within the knowledge of those skilled in the art. After a suitable reaction period, the mixture is poured into ice water whereupon the oxazole product precipitates as a yellow solid. The latter is recovered and purified by conventional procedures.

In a preferred method for carrying out the reaction, a molar proportion of terephthaloyl chloride dissolved in toluene is added with stirring to an aqueous solution of two molar proportions of the appropriate aminoketone hydrochloride while the temperature is maintained below about 10° C. After completion of the addition, solid potassium bicarbonate is added to react with the hydrogen chloride present in the reaction mixture. Thereafter, the reaction mixture is stirred for a period of from ten to sixteen hours or longer while the temperature is permitted to rise to room temperature whereupon a reaction takes place with the precipitation of the intermediate azaketone in the reaction mixture. The latter is recovered and purified, if desired, by conventional procedures. The intermediate azaketone is then added slowly with stirring to concentrated sulfuric acid and the stirring continued until all the solid is in solution and for about one hour thereafter. The resulting mixture is then added to ice water to precipitate the desired oxazole compound. The latter is recovered and purified by conventional methods.

The following examples illustrate the invention but are not to be construed as limiting:

EXAMPLE 1

*1,4-Bis[2-(4-Ethyl-5-Phenyloxazolyl)]Benzene*

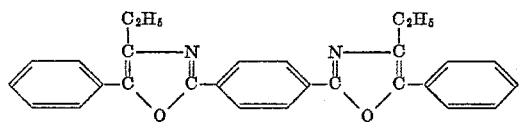

A solution of 3.78 grams (0.019 mole) of terephthaloyl chloride in 75 milliliters of toluene cooled to 5° C. was added with stirring to a cooled mixture of 7.2 grams (0.036 mole) of α-aminobutyrophenone hydrochloride in 50 milliliters of water. One drop of 10 percent aerosol was added to the mixture. Potassium bicarbonate was then added slowly and with cooling to the mixture to react with the hydrogen chloride. The mixture was then stirred for about 18.5 hours while gradually warming to room temperature to obtain as precipitate a terephthaloylbis (α-aminobutyrophenone) intermediate. The latter was recovered by filtration, washed with water and aqueous ammonia and dried.

3.7 grams (0.008 mole) of terephthaloylbis(α-aminobutyrophenone) above prepared, was added slowly and with stirring to 35 milliliters of concentrated sulfuric acid. Stirring was continued for about one hour, after which time the mixture was poured into water to precipitate a 1,4-bis[2-(4-ethyl-5-phenyloxazolyl)]-benzene product as a yellow solid. The latter was recovered by filtration, washed with water and ammonium hydroxide, dried and recrystallized from toluene to obtain a purified product melting at 213.5°–214.5° C.

EXAMPLE 2

*1,4-Bis[2-(4-Methyl-5-Phenyloxazolyl)]Benzene*

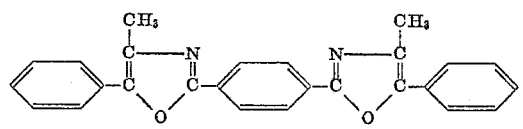

In an operation carried out in a similar manner, a solution of 3.78 grams (0.019 mole) of terephthaloyl chloride in 75 milliliters of toluene was added with stirring to a solution of 14.4 grams (0.078 mole) of α-aminopropiophenone hydrochloride in 50 milliliters of water while the temperature was kept about 5° C. About 15 grams of solid potassium bicarbonate was then added in portions over about a 5-minute period while the temperature of the reaction mixture was kept about 5° C. Thereafter, the reaction mixture was stirred for about 23 hours and the temperature of said mixture then allowed to warm to room temperature. As a result of these operations, a reaction took place with the formation of a terephthaloylbis(α-aminopropiophenone) intermediate as a solid material. The latter was recovered by filtration, purified by treating in successive steps with water, aqueous ammonia, glacial acetic acid and water. The intermediate thus treated melted at 240–242° C. and gave no melting point depression on a mixed melting point determination with a pure sample of terephthaloylbis(α-aminopropiophenone) previously prepared.

In carrying out the cyclization step, 12.84 grams (0.030 mole) of terephthaloylbis(α-aminopropiophenone) was added slowly and with stirring to 130 milliliters of concentrated sulfuric acid. Stirring was continued until all the solid was in solution and for 1½ hours thereafter. The resulting mixture was poured into about 700 milliliters of ice water-mixture to precipitate a 1,4-bis[2-(4-methyl-5-phenyloxazolyl)]benzene product as a yellow solid. The mixture was warmed to coagulate the solid, the solid recovered by filtration, washed with water, aqueous ammonia, dried and recrystallized from xylene to obtain a purified product melting at 233°–234° C.

EXAMPLE 3

1,4-Bis[2-(4-Butyl-5-Phenyloxazolyl)]Benzene

In a manner similar to that described in Example 1, a solution of 4 grams (0.02 mole) of terephthaloyl chloride in 80 milliliters of toluene is added with stirring to a solution of 9 grams (0.04 mole) of α-aminocaprophenone hydrochloride in 50 milliliters of water while the temperature is maintained between 5° and 10° C. Thereafter, about 8 grams (0.08 mole) of potassium bicarbonate is added slowly and with cooling; after completion of the addition, the mixture is stirred for about 16 hours while the temperature of the mixture is allowed to rise to room temperature to obtain a terephthaloylbis(α-aminocaprophenone) intermediate as a solid having a molecular weight of 484.

4.6 grams (0.01 mole) of terephthaloylbis(α-aminocaprophenone) prepared in the manner above described is added slowly and with stirring to about 50 milliliters of concentrated sulfuric acid and the stirring continued for about one hour. The mixture is then poured into ice water to obtain a 1,4-bis[2-(4-n-butyl-5-phenyloxazolyl)]benzene product as a solid having a molecular weight of 476.

EXAMPLE 4

In operations carried out in a manner similar to that described in Example 1, the following compounds are prepared:

1,4-bis[2-(4-n-propyl-5-phenyloxazolyl)]benzene having a molecular weight of 448 by the reaction of terephthaloyl chloride and α-aminovalerophenone hydrochloride to produce the intermediate terephthaloylbis(α-aminovalerophenone) followed by cyclization of the latter with concentrated sulfuric acid.

1,4-bis[2-(4-isopropyl-5-phenyloxazolyl)]benzene having a molecular weight of 448 by the reaction of terephthaloyl chloride and α-aminoisovalerophenone hydrochloride to produce the intermediate terephthaloylbis(α-aminoisovalerophenone) followed by the reaction of the latter with concentrated sulfuric acid.

1,4-bis[2-(4-isobutyl-5-phenyloxazolyl)]benzene having a molecular weight of 476 by the reaction of terephthaloyl chloride and α-aminoisocaprophenone hydrochloride to produce the intermediate terephthaloylbis(α-aminoisocaprophenone) followed by the reaction of the latter with concentrated sulfuric acid.

EXAMPLE 5

1,4-Bis[2-(4,5-Diphenyloxazolyl)]Benzene

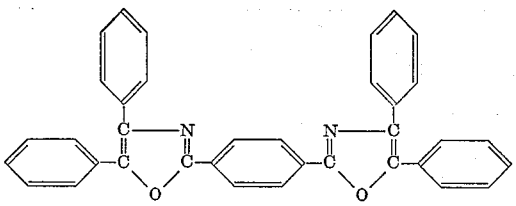

A solution of 3 grams (0.015 mole) of terephthaloyl chloride in 65 milliliters of toluene was added with stirring to a solution of 7.05 grams (0.028 mole) of α-amino-α-phenylacetophenone hydrochloride in 50 milliliters of water and the mixture cooled to about 5° C. About 5 grams of solid potassium bicarbonate was added over about a 5-minute period while cooling was continued to maintain the temperature about 5° C. Additional toluene and water was added to facilitate stirring and the mixture was then stirred over a period of about 3 hours while the mixture was allowed to warm to room temperature to produce a terephthaloylbis(α-amino-α-phenylacetophenone) intermediate. The latter was recovered by filtration and washed.

6.75 grams (0.012 mole) of terephthaloylbis(α-amino-α-phenylacetophenone) intermediate prepared as above described was added slowly and with stirring to 70 milliliters of concentrated sulfuric acid and the stirring continued for about 1½ hours after the solution become homogeneous. Thereafter, the mixture was poured into 400 milliliters of water to precipitate the desired 1,4-bis[2-(4,5-diphenyloxazolyl)]benbene product as a yellow solid. The latter was recovered by filtration and recrystallized from xylene to obtain a purified product melting at 260°–261° C.

EXAMPLE 6

1,4-Bis[2-(5-Phenyl-4-(2,5-Xylyl)Oxazolyl)]Benzene

In a similar manner, a solution of 4 grams (0.02 mole) of terephthaloyl chloride in 80 milliliters of toluene is added with stirring to a solution of 11 grams (0.04 mole) of α-amino-α-(2,5-xylyl)-acetophenone hydrochloride in 80 milliliters of water while the temperature is maintained below about 10° C. Thereafter, about 8 grams (0.08 mole) of potassium bicarbonate is added slowly and with cooling; after completion of the addition, the mixture is stirred for about twelve hours while the temperature of the mixture is allowed to rise to room temperature to obtain a terephthaloylbis(α-amino-α-(2,5-xylyl)acetophenone) intermediate as a solid having a molecular weight of 608.

Six grams (0.01 mole) of terephthaloylbis(α-amino-α-(2,5-xylyl)acetophenone) intermediate prepared in a manner above described is added slowly and with stirring to 50 milliliters of concentrated sulfuric acid and the stirring continued for about one hour. The mixture is then poured into ice water to obtain a 1,4-bis[2-(5-phenyl-4-(2,5-xylyl)oxazolyl)]benzene as a solid having a molecular weight of 572.

EXAMPLE 7

In operations carried out in a similar manner, the following compounds are prepared:

1,4-bis[2-(5-phenyl-4-(o-tolyl)oxazolyl)]benzene having a molecular weight of 544 by the reaction of terephthaloyl chloride and α-amino-α-(o-tolyl)-acetophenone hydrochloride to produce the intermediate terephthaloylbis(α-amino-α-(o-tolyl)acetophenone) followed by the cyclization of the latter with concentrated sulfuric acid.

1,4-bis[2-(5-phenyl-4-(m-tolyl)oxazolyl)]benzene having a molecular weight of 544 by the reaction of terephthaloyl chloride and α-amino-α-(m-tolyl)-acetophenone hydrochloride to produce the intermediate terephthaloylbis(α-amino-α-(m-tolyl)acetophenone) followed by the reaction of the latter with concentrated sulfuric acid.

1,4-bis[2-(5-phenyl-4-(3,4-xylyl)oxazolyl)]benzene having a molecular weight of 572 by the reaction of terephthaloyl chloride and α-amino-α-(3,4-xylyl)acetophenone hydrochloride to produce the intermediate terephthaloylbis(α-amino-α-(3,4-xylyl)acetophenone) followed by the reaction of the latter with concentrated sulfuric acid.

1,4-bis[2-(4-(p-ethylphenyl)-5-phenyloxazolyl)]benzene having a molecular weight of 572 by the reaction of terephthaloyl chloride and α-amino-α-(p-ethylphenyl)-acetophenone hydrochloride to produce the intermediate terephthaloylbis(α-amino-α-(p-ethylphenyl)acetophenone) followed by the reaction of the latter with concentrated sulfuric acid.

1,4-bis[2-(5-phenyl-4-(2,4-xylyl)oxazolyl)]benzene having a molecular weight of 572 by the reaction of terephthaloyl chloride and α-amino-α-(2,4-xylyl)acetophenone hydrochloride to produce the intermediate terephthaloyl-bis(α-amino-α-(2,4-xylyl)acetophenone) followed by the reaction of the latter with concentrated sulfuric acid.

1,4-bis[2-(4-m-ethylphenyl-5 - phenyloxazolyl)]benzene having a molecular weight of 572 by the reaction of terephthaloyl chloride and α-amino-α-(m-ethylphenyl)acetophenone hydrochloride to produce the intermediate terephthaloyl-bis(α-amino-α-(m-ethylphenyl)acetophenone) followed by the reaction of the latter with concentrated sulfuric acid.

The products of the present invention have numerous utilities. As chemical intermediates, reactive groups may be introduced into the aromatic rings to serve as building blocks for more complex compounds such as those suitable for pharmaceuticals and dyes. Moreover, certain reactive groups, e.g. sulfonic acid group, may be introduced to adapt the existing utilities to particular applications, such as serving as a linking group or a solubilizing group.

Another utility for the novel oxazole compounds is as optical brightening agents. In such application, the compounds may be incorporated in textiles, yarns, paper and other fibrous materials, soaps, detergents, etc. to produce brightening or whitening.

It has been discovered that the new oxazole compounds have outstanding light emission characteristics suitable for exploitation as agents for detection by instruments employed in assay techniques for measuring radioactivity. Thus, compositions comprising the novel oxazole compounds are extremely valuable for scintillators, for measuring radiation and especially for beta and gamma rays. As scintillators, the oxazole compounds may be employed in both liquid and plastic scintillation counting methods. They are further adapted to be employed both as primary solutes and as secondary solutes. For use as scintillators, the novel compounds have a combination of desirable properties inclusive of appropriate fluorescence maxima, pulse height, economic feasibility and solubility. Suitability for this use was established by the determination of fluorescence maxima. In representative operations, 1 gram of each of 1,4-bis[2-(4-methyl-5-phenyloxazolyl)]benzene, 1,4-bis[2-(4-ethyl - 5 - phenyloxazolyl)]benzene was separately dissolved in 1 liter of toluene and the fluorescence maxima read on an Aminco-Bowman spectrophotofluorometer. The fluorescence maximum was found to be 4300A (angstrom units) for 1,4-bis[2-(4-methyl-5-phenyloxazolyl)]benzene, 4300A for 1,4-bis[2-(4-ethyl-5-phenyloxazolyl)]benzene.

In addition to the desirable emission properties, the novel oxazole compounds of the present invention have solubility characteristics in liquid scintillation counting solvents which are not possessed by the useful secondary solutes currently employed in liquid scintillation counting or by other compounds which have emission spectra in the proper wavelength region. The novel compounds have outstanding solubility not possessed by currently available useful secondary solutes, not only in conventional solvents but in newer, more economical solvents and particularly in the high flash point solvents desirable for newly developed large scale counters. Suitable secondary solutes are presently lacking for such solvents. Moreover, the novel compounds maintain good solubility properties with varying temperatures. Thus, the novel compounds fill a very significant need in scintillation counting. Representative solubility difference between 1,4-bis[2-(methyl-5-phenyloxazolyl)]benzene and the presently best available and currently employed secondary solute, namely "POPOP" (or 1,4-bis[2-(5-phenyloxazolyl)]benzene) may be seen from the following table:

| Compound | Solubility at 25° C. in grams per liter | |
|---|---|---|
| | Toluene | TS-28* |
| 1,4-Bis[2-(4-methyl-5-phenyloxazolyl)]benzene | 3.1 | 1.03 |
| POPOP | 0.95 | 0.31 |

*Commercial petroleum hydrocarbon solvent, flash point 110° F., boiling point range, 321-398° F.

In carrying out the method of the present invention, samples or subjects emitting radiation and compositions comprising the new oxazole compounds in organic liquid or plastic solvents as counting media are appropriately placed in a suitable counting instrument and counts made. The particular steps in the preparation of the samples or subjects and of the counting media will vary with the size of the sample, the nature of the sample or subject, the counting instrument, the nature of the radiation to be counted, and the nature of the plastic or liquid solvent. The present method embraces the employment of compositions which may contain in addition to the novel oxazole compounds, primary solutes, neutron capture solutes, gamma conversion solutes, primary and secondary solvents, gels, suspending or solubilizing agents and other modifying agents. The present method also embraces internal and external counting, i.e., wherein the sample to be counted is placed in the counting medium as is common practice with small samples and wherein the sample or subject is positioned outside the counting medium such as in certain large samples or animal counters, respectively.

The exact amount or concentration of the oxazole compound to be employed in carrying out the method of the present invention may vary provided that an amount adequate to produce a useful response to the detector system is employed. Thus, amounts to be employed in liquid scintillation counting will frequently differ from that employed in plastic scintillation counting. In general, a useful range includes from as little as 0.005 percent of the solution to as high as 10 percent or more depending on the particular solvent system, primary solute, counter and counting technique.

Compositions comprising the oxazole compounds of the present invention may be prepared which are adapted to be employed in carrying out the methods of the present invention. In liquid scintillation counting compositions, the concentration of the oxazole compound will vary depending on whether it is a concentrate composition to be further diluted prior to use or whether it is a counting composition. Thus, liquid scintillation counting compositions may contain from about 0.05 gram to about 5 grams of the oxazole compounds of the present invention per liter of liquid scintillation solvent. Suitable liquid scintillation solvents are generally transparent hydrocarbons, ethers, or binary mixtures as hydrocarbon-alcohol, hydrocarbon-ether or hydrocarbon-ester. Examples of suitable solvents include toluene, phenylcyclohexane, xylene, triethylbenzene, anisole, p-cymene, dioxane, cyclohexane, heptane, 1,2-dimethoxyethane, toluene-methanol, toluene-ethanol, naphthalene-dioxane, naphthalene-tributyl phosphate and aromatic hydrocarbon solvents sold under trade names such as TS-28, SK-50, SK-40, Solvent V-150, etc.

Particularly valuable liquid scintillator compositions are those comprising one of the novel oxazole compounds as secondary solute, diphenyloxazole or terphenyl as primary solute, and aromatic hydrocarbon as solvent. Other useful liquid scintillator compositions may be similar to the foregoing but in which diphenyloxazole or terphenyl is replaced by some other primary solute such as phenylbiphenyloxadiazole. These liquid scintillator compositions contain the novel oxazole compound in amounts of from about 0.005 gram to about 1 gram, and the primary solute in amounts of from about 2 to about 9 grams all in one liter of composition.

In the preparation of liquid scintillators the oxazole compound is added to a suitable liquid scintillator solvent and the resulting mixture stirred until a homogeneous solution is obtained. The composition thus obtained may be used as such or may be concentrates which are diluted to provide compositions suitable for addition thereto for primary solutes and/or other additaments for appropriate counting media.

In the preparation of a plastic scintillator, the oxazole compound is added to a polymer or polymerization mixture prior to molding or casting. When the plastic scintillator is to be prepared by molding, an appropriate polymeric molding powder and the oxazole compound with or without other additaments are mixed together and heated in a mold to a pressure and to a temperature necessary for curing the particular polymer and thereafter cooled to obtain a plastic scintillator. Alternatively, an appropriate monomer and oxazole compound with or without solutes and/or other additaments are mixed together in a suitable vessel and a polymerization catalyst added thereto to obtain a plastic scintillator. Suitable polymeric materials for plastic scintillators include polystyrene and polyvinyltoluene.

The determination of radiation emitted by radioactive samples by the use of new oxazole compounds is illustrated by the following example.

EXAMPLE A 15 milliliters of a solution containing 5 grams per liter of 2,5-diphenyloxazole and 0.5 gram per liter of 1,4-bis[2-(4-methyl-5-phenyloxazolyl)]benzene in toluene was placed in a cell of a scintillation detector and 1 milliliter of $C^{14}$ labelled benzoic acid solvent containing 0.005 microcurie of acid per milliliter of solution added thereto. The cell was placed in a Baird Atomic scintillation counter and the counts-per-minute determined. It was found to be 4.5 times $10^3$.

EXAMPLE B

In a similar manner, 15 milliliters of a solution containing 5 grams per liter of 2,4-diphenyloxazole and 0.5 gram per liter of 1,4-bis[2-(4-methyl-5-phenyloxazolyl)]benzene in commercial petroleum hydrocarbon solvent (flash point, 105° F.) and 1 milliliter of $C^{14}$ labelled benzoic acid solution containing 0.005 microcurie per milliliter in a cell of a scintillation detector and the cell placed in a scintillation counter to determine the counts-per-minute.

EXAMPLE C

In separate operations, concentrate compositions of oxazole compounds having the formula

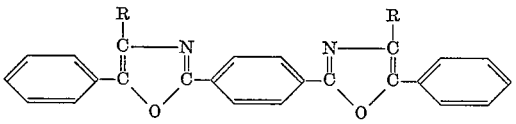

in liquid scintillation solvents and suitable for dilution and addition of primary solutes and/or other additaments are prepared as follows:

COMPOSITION A

Three grams of 1,4-bis[2-(4-methyl-5-phenyloxazolyl)]benzene are mixed together with a sufficient amount of toluene to prepare 1 liter of a clear solution.

COMPOSITION B

Four grams of 1,4-bis[2-(4-ethyl-5-phenyloxazolyl)]benzene are mixed together with a sufficient amount of toluene to prepare 1 liter of a transparent composition.

COMPOSITION C

One gram of 1,4-bis[2-(4-methyl-5-phenyloxazolyl)]benzene are mixed together with a sufficient amount of a commercial high aromatic petroleum hydrocarbon solvent having a flash point of 140° to prepare 1 liter of a transparent solution.

EXAMPLE D 30 grams of diphenyloxazole are added with stirring to 1 liter of Composition A in Example C. 167 milliliters of the resulting solution are diluted to 1 liter with toluene and stirred to obtain a clear, homogeneous counting solution. 15 milliliters of the resulting solution are placed in a cell of a scintillation detector and 1 milliliter of $C^{14}$ labelled 1,1,1-trichloroethane added thereto. The cell is placed in a scintillation counter and counts-per-minute read.

EXAMPLE E 18 grams of terphenyl are added with stirring to 1 liter of Composition A in Example C. 167 milliliters of the resulting solution are diluted to 1 liter with toluene and stirred to obtain a clear, homogeneous counting solution. 15 milliliters of the resulting solution are placed in a cell of a scintillation detector and 1 milliliter of $C^{14}$ labelled chloroform added thereto. The cell is placed in a scintillation counter and the counts-per-minute read.

The aminoketone reactant to be employed in the preparation of the oxazole compounds of the present invention may be prepared according to the following sequence of steps:

(1) Benzene is acylated with an appropriate acid chloride or anhydride by heating the mixture at reflux temperature in the presence of aluminum chloride or phosphorus pentoxide catalyst to produce an acylophenone

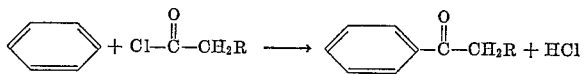

(2) The acylophenone is brominated with an equimolar proportion of bromine by the addition of bromine to an acetic acid solution of the acylophenone while the temperature is maintained between about —5° C. and 10° C. to produce an α-bromoketone

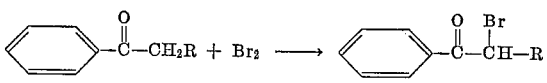

(3) The α-bromoketone is heated at about 160°–170° C. and shaken with potassium phthalimidate to produce an α-phthalimidoketone which is then heated with hydrochloric acid to produce the α-aminoketone starting material as the hydrochloride salt

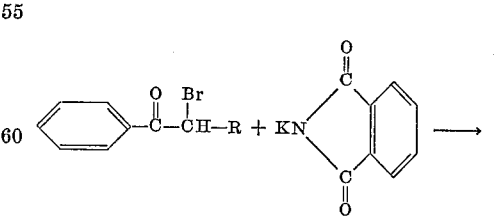

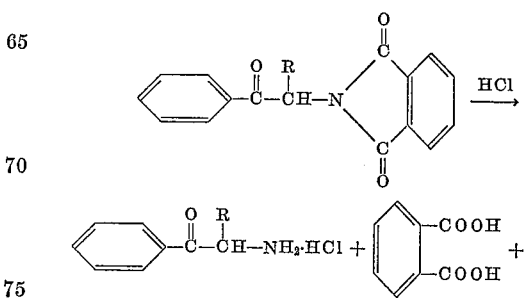

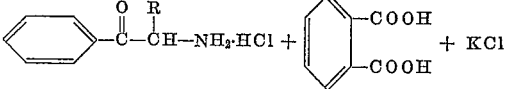

We claim:
1. A compound having the formula

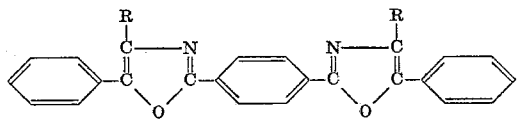

wherein R is selected grom the group consisting of lower alkyl containing from 1 to 4 carbon atoms, inclusive, phenyl, tolyl, xylyl and ethylphenyl.

2. 1,4-bis[2-(4-methyl-5-phenyloxazolyl)]benzene.
3. 1,4-bis[2-(4-ethyl-5-phenyloxazolyl)]benzene.
4. 1,4-bis[2-(4-phenyl-5-phenyloxazolyl)]benzene.

References Cited in the file of this patent

UNITED STATES PATENTS

| | | |
|---|---|---|
| 2,726,246 | Trosken | Dec. 6, 1955 |
| 2,832,787 | Bernstein et al. | Apr. 29, 1958 |

FOREIGN PATENTS

| | | |
|---|---|---|
| 1,227,469 | France | Mar. 7, 1960 |

OTHER REFERENCES

Rogers et al.: Chem. Abstracts, vol. 49, cols. 7559–7560 (1955).